United States Patent Office 3,533,235
Patented Oct. 13, 1970

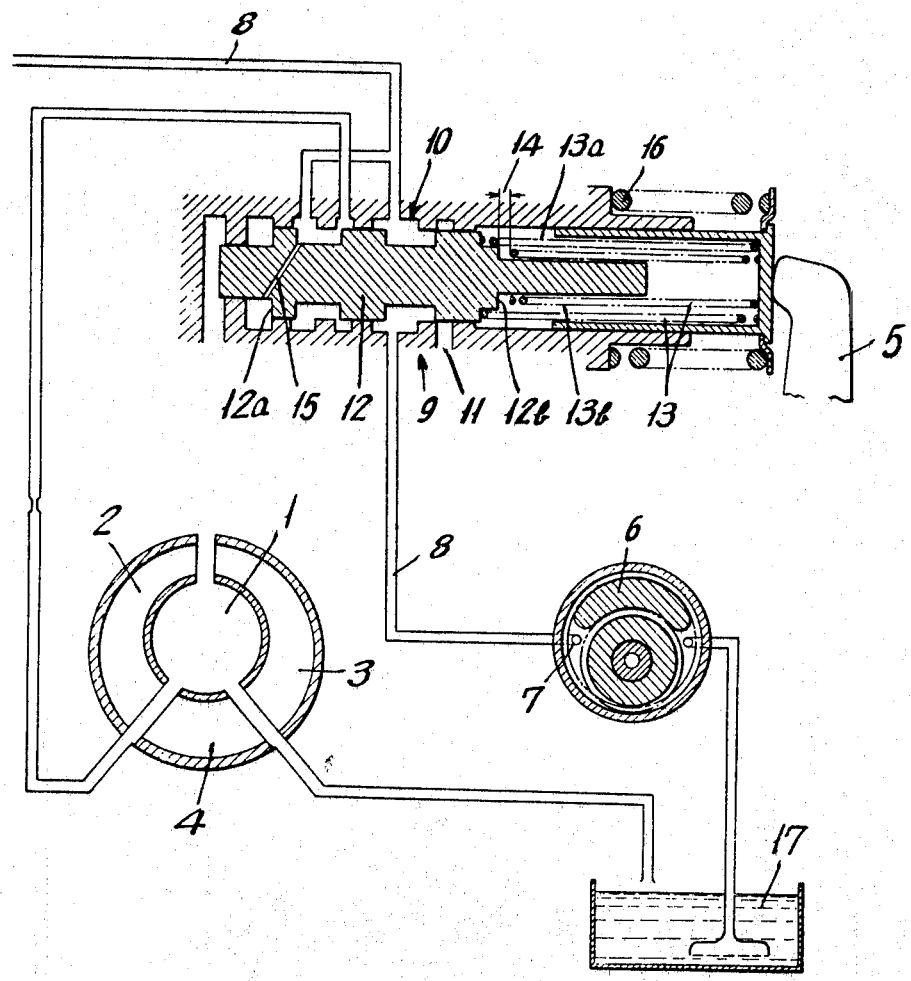

3,533,235
PRESSURE CONTROLLING APPARATUS FOR OPERATING PRESSURE FLUID IN AUTOMATIC TRANSMISSION
Tomio Oguma, Iruma-gun, Saitama-ken, and Sadanori Nishimura, Tokyo, Japan, assignors to Honda Giken Kogyo Kabushiki Kaisha, Tokyo, Japan
Filed Feb. 7, 1969, Ser. No. 797,602
Claims priority, application Japan, Feb. 7, 1968, 43/7,195
Int. Cl. F16d 31/06
U.S. Cl. 60—54
3 Claims

ABSTRACT OF THE DISCLOSURE

A pressure control apparatus is disposed between the output of a pump driven by a prime mover and a clutch operated by the pressure of the fluid discharged from the pump, so that a substantially uniform pressure is delivered both in a speed change range of a torque converter and in the speed change range of a gear apparatus. The control apparatus is constituted by a displaceable valve acted on by the pressure of the output of the pump during speed change of the gear apparatus, so as to be displaceable to open a leakage outlet and maintain uniform pressure of the delivered fluid upon increasing output of the pump. The valve is also acted on by a member responsive to the reaction force in the torque converter so that the leakage opening is closed in the speed change range of the torque converter, two parallel springs being interposed between the valve and the member, one having play to be inoperative during only slight advance of the member.

BRIEF SUMMARY OF THE INVENTION

It has been previously proposed in an automatic transmission for a motorcar or the like, in which a prime mover such as an internal combustion engine is connected through a torque converter to a gear speed-change machine including a friction engaging apparatus, such as a friction clutch or the like, that the pressure of an operating fluid supplied to a friction engaging apparatus be controlled substantially in proportion to the stator reaction force of the torque converter. The pressure control apparatus disclosed therein is such that there are provided, in a pressure fluid passage connected to a discharge outlet of a pump driven by the engine, a leakage opening and a valve for opening and closing the leakage opening, the valve being displaceable to open the leakage opening by the pressure fluid within said passage and being displaceable to close the leakage opening by a reaction force detecting member which advanced as the stator reaction force in the torque converter increases, a pressure control spring being interposed between the detecting member and the valve.

In this case, if the reaction force detecting member undergoes comparatively small displacement (to make the apparatus small in size) the pressure control spring must have a comparatively large spring constant to produce suitable displacement of the valve. If such a pressure control spring is used, however, any change in the pump discharge amount due to change of the engine revolution speed causes a displacement of the pressure controlling valve, whereby the spring force of the pressure control spring, causes the valve to undergo a comparatively large change.

The use of such a pressure control spring introduces the following drawback in an automatic transmission. Namely, it is usual that the torque converted effects a speed-change operation within a range wherein the rotation speed of the output shaft is comparatively low and the output torque is comparatively large, that is, for example, within the range from starting to a predetermined running speed of a motorcar, whereas a gear speed-change machine effects a speed-change operation after the foregoing torque converter speed-change range has passed, in other words, under the coupling condition of the torque converter (the stator reaction force is zero on this occasion).

If, for this reason, the operating fluid pressure is varied within the speed-change range of the gear speed-change machine, there is caused, for instance, the drawback that the time required for the time of switch-over supply of the operating fluid to the time of connection of the friction engaging apparatus supplied with said fluid becomes indefinite.

Accordingly, it is required that, within the speed-change range of the speed-change machine, the operating fluid pressure must be kept always constant regardless of any variation of the pump discharge quantity.

This invention has for its object to provide a pressure controlling apparatus satisfying such requirement. According to this invention, there is provided a pressure controlling apparatus of the type in which a pressure fluid conduit connected to a discharge outlet of a pump driven by a prime mover such as an internal combustion engine or the like, is provided with a leakage opening and a valve for opening and closing the leakage opening, the valve being displaceable to open the leakage outlet by the pressure fluid within the conduit and to close the leakage outlet by the action of a pressure controlling spring interposed between the valve and a reaction force detecting member arranged to advance as the stator reaction force in the torque converter is increased, the apparatus being characterized in that the pressure control spring is composed of first and second parallel springs, one of these springs being interposed with play so as to be inoperative within the range of a small advance of the reaction force detecting member.

BRIEF DESCRIPTION OF THE DRAWING

The sole figure of the drawing is a diagrammatic illustration, partly in section of pressure control apparatus according to the invention.

DETAILED DESCRIPTION

Referring to the drawing, numeral 1 denotes a torque converter comprising a pump impeller 2, a turbine impeller 3 and an intermediate stator impeller 4. The torque converter 1 is interposed between a prime mover (not shown) such as an internal combustion engine and a speed-change machine (not shown) including a friction engaging apparatus operable by a pressure fluid such as an oil pressure clutch, for constituting an automatic transmission apparatus by those members.

The torque converter 1 is further provided with a reaction force detecting member 5 arranged to be advanced to the left in the drawing as the reaction force applied to the stator impeller 4 is increased. Such construction is entirely conventional and need not be described in detail.

Numeral 6 denotes a pressure fluid pump driven by the engine, and the pump 6 is connected at its discharge opening 7 through a pressure fluid conduit 8 to the foregoing friction engaging apparatus, so that by the opening of a valve (not shown) the pressure fluid is supplied therefrom to the friction engaging apparatus, for operating the same.

In principle, in this kind of apparatus, the stator reaction in the torque converter is substantially proportional to the output torque of the torque converter, while it is sufficient that the coupling pressure of the friction engaging apparatus, i.e. the pressure of the pressure fluid supplied to the friction engaging apparatus need only be substantially proportional to the output torque. Accordingly it is preferable that the pressure fluid supplied to the friction engaging apparatus be at a pressure substantially proportional to the stator reaction force, at least in the torque converter speed-change range, that is the largest in load. In other words, it is preferable that the pressure of the pressure fluid is not made unnecessarily high because this brings about unnecessary increase in load on the pump.

For automatically carrying out the pressure control of the pressure fluid, apparatus 9 is interposed in the passage 8. Namely, a valve chamber 10 is provided in the passage 8, and the chamber 10 is provided with a leakage opening 11 and a slidable valve 12 for opening and closing the size of opening 11. In the drawing, the opening 11 is closed by valve 12. The valve 12 is supplied at one side end surface 12a thereof with the pressure fluid within the passage 8 through a diverged passage 15 for being operated to move to the right in the drawing to increase the size of the leakage opening 11, and, acting on the other end surface 12b of the valve 12 is a controlling pressure spring 13 supported at its rear surface by the reaction force detecting member 5 for moving the valve 12 to the left in the drawing to decrease the size of leakage opening 11. Thus valve 12 is subject to the pressure fluid acting on the end surface 12a and the pressure of the pressure controlling spring 13 acting on the other end surface 12b, and if the former is larger, the degree of opening of the leakage opening 11 is increased to increase the amount of outflow of the pressure fluid and thereby produce corresponding pressure decrease of the pressure fluid. If, on this occasion, the reaction force detecting member 5 is then displaced to the left in accordance with increase of the stator reaction force, the pressure controlling spring 13 is increased in its spring force, so that the valve is displaced to decrease the leakage amount of the pressure fluid from opening 11 so that there is produced corresponding pressure increase of the pressure fluid. Thus, the pressure fluid is automatically pressurized to a value corresponding to the amount of advancement of the reaction force detecting member 5. Numeral 16 denotes a spring for balancing the stator reaction force and numeral 17 denotes a fluid tank.

It can be considered in this kind of apparatus that the reaction force detecting member 5 is designed to undergo comparatively small shifts of movement, in order to make the apparatus small in size. In this case, however, a pressure controlling spring of comparatively large spring constant must be used in order to make the pressure control range comparatively large, i.e. a fairly rigid connection must be provided between member 5 and valve 12.

By the use of such a pressure controlling spring 13 as above, however, the change of the output of the pump 6 in accordance with the change of the engine revolution speed causes a comparatively large change in the spring force, that is, the control pressure value, and such change will cause the drawback as mentioned hereinbefore within the speed-change range of the speed-change machine.

The construction of the invention removes such deficiencies. Namely, the pressure controlling spring 13 interposed between the reaction force detecting member 5 and the end surface 12b of the valve 12 is composed of a first spring 13a and a second spring 13b parallel to one another. The first spring 13a is held between the two members 5 and 12 without any play so as to be operative even with small displacement of the pressure controlling valve 12, whereas the second spring 13b is interposed between the two members 5 and 12 with a small gap 14 so as to be kept inoperative during small displacement of the pressure controlling valve 12. Thus the second spring 13b may become operative with the first spring 13a only by the advance of member 5 beyond a predetermined amount.

In other words, under the condition wherein the stator reaction force is zero and accordingly there is no advance of the reaction force detecting member 5 (the gear speed-change machine speed-change range), only the pressure controlling spring 13a acts on valve 12 so that the spring resistance is comparatively small and accordingly even when the discharge output of the pump is increased by increase of the engine speed and the pressure controlling valve 12 is displaced to open the leakage opening 11, the increase in the compression force of the pressure controlling spring 13a is very small. Namely, the compression force of the pressure controlling spring scarcely changes even by the change of the discharge output of the pump, so that the pressure of the operating fluid can be kept almost constant. If the load is increased above a predetermined value to produce a stator reaction force and the reaction force detecting member 5 is advanced a predetermined amount, (the torque converter speed-change range), both springs 13a and 13b are operative to offer large spring resistance, and accordingly after the two springs have become operative, the compression force of the spring 13, that is, the controlling pressure value is increased abruptly even by a small advance of the reaction force detecting member 5.

Thus, according to this invention, in the vicinity of zero stator reaction force, only one pressure controlling spring operates to provide comparatively low spring resistance, so that within the speed-change range of the gear change, the operating fluid pressure may be kept nearly constant regardless of any change of the pump output, and accordingly there can be removed the deficiency in the use of a single spring of comparatively large spring constant as mentioned before. Upon increase of the stator reaction force, both pressure controlling springs are operative to provide comparatively large spring resistance, so that there can be obtained sensitive operation similar to the case of a single spring of comparatively large spring resistance.

What is claimed is:

1. A pressure controlling apparatus for an operating pressure fluid in an automatic transmission apparatus of the type in which a pressure fluid passage connected to the discharge outlet of a pump driven by a prime mover is provided with a leakage opening and a displaceable valve for opening and closing the leakage opening, said valve being movable, by increased pressure fluid within said passage, to open the leakage opening while being movable by a pressure controlling spring supported at its rear surface by a reaction force detecting member to close the leakage opening as the stator reaction force in a torque converter is increased, said apparatus comprising the arrangement wherein the pressure controlling spring comprises first and second springs parallel to one another, one of said springs being interposed between the valve and detecting member with play so as to be inoperative within the range of slight advance of the reaction force detecting member.

2. Apparatus as claimed in claim 1 wherein the other of said springs is tightly interposed between the valve and the detecting member to be fully operative for slight advance of the detecting member.

3. Apparatus as claimed in claim 2 wherein both said springs are operative when the detecting member is displaced to a predetermined position in which the play has been taken up.

References Cited

UNITED STATES PATENTS 2,898,740   8/1959   Kelley _____ 60—54
3,173,339   3/1965   Larsen.

EDGAR W. GEOGHEGAN, Primary Examiner